(12) United States Patent
Williams

(10) Patent No.: US 7,074,124 B2
(45) Date of Patent: Jul. 11, 2006

(54) VENTILATION SYSTEM

(75) Inventor: David Earle Williams, Levin (NZ)

(73) Assignee: Edwards & Williams Greenhouses Ltd., Wellington (NZ)

( * ) Notice: Subject to any disclaimer, the term of this patent is extended or adjusted under 35 U.S.C. 154(b) by 0 days.

(21) Appl. No.: 10/408,776

(22) Filed: Apr. 8, 2003

(65) Prior Publication Data

US 2004/0121721 A1  Jun. 24, 2004

(30) Foreign Application Priority Data

Dec. 24, 2002 (NZ) .................................... 523395

(51) Int. Cl.
  *F24F 7/02* (2006.01)
(52) U.S. Cl. .................. 454/358; 47/17; 119/436
(58) Field of Classification Search ................ 454/339, 454/358, 364, 250; 160/19, 38, 327; 52/199; 47/17; 119/436
See application file for complete search history.

(56) References Cited

U.S. PATENT DOCUMENTS

| 4,064,648 A | * | 12/1977 | Cary ............................... 47/17 |
| 4,382,435 A | * | 5/1983 | Brill-Edwards ............. 126/622 |
| 4,730,552 A | * | 3/1988 | Murray ....................... 454/250 |
| 4,825,921 A | * | 5/1989 | Rigter ........................ 160/23.1 |
| 4,915,022 A | | 4/1990 | Lynch |
| 4,955,287 A | * | 9/1990 | Dupont ........................ 454/358 |
| 5,410,844 A | | 5/1995 | Lynch |
| 5,433,663 A | * | 7/1995 | Henningsson et al. ....... 454/358 |
| 6,089,973 A | * | 7/2000 | Schultz ....................... 454/250 |
| 6,234,893 B1 | | 5/2001 | Meredith |
| 6,464,425 B1 | * | 10/2002 | Closkey ....................... 404/26 |
| 6,558,251 B1 | * | 5/2003 | Sells ........................... 454/359 |
| 2003/0140582 A1 | * | 7/2003 | Sells ........................... 52/198 |

FOREIGN PATENT DOCUMENTS

| JP | 60232443 A | * | 11/1985 | ................. 454/358 |
| JP | 06042277 A | * | 2/1994 | |
| WO | WO 02/052112 | | 7/2002 | |
| WO | WO 3007695 A1 | * | 1/2003 | |

* cited by examiner

*Primary Examiner*—Gregory Wilson
*Assistant Examiner*—Harold Joyce
(74) *Attorney, Agent, or Firm*—Banner & Witcoff, Ltd.

(57) ABSTRACT

The present invention relates to a ventilation system that allows air to circulate in a building but excludes pests such as birds, insects, moths and flies to enter the building. The ventilation system includes at least one vent comprising an aperture in the roof of the building and at least one fabric member adapted to be attached to the roof inside the building, below the vent(s) and between the vent(s) and the interior of the building. The present invention also relates to a building including the ventilation system, a truss arrangement that may form part of the ventilation system and a retaining rail for use in the ventilation system. The system of the invention has particular, but not exclusive, application to greenhouses and animal shelters.

8 Claims, 2 Drawing Sheets

VENTILATION SYSTEM

Figure 1:
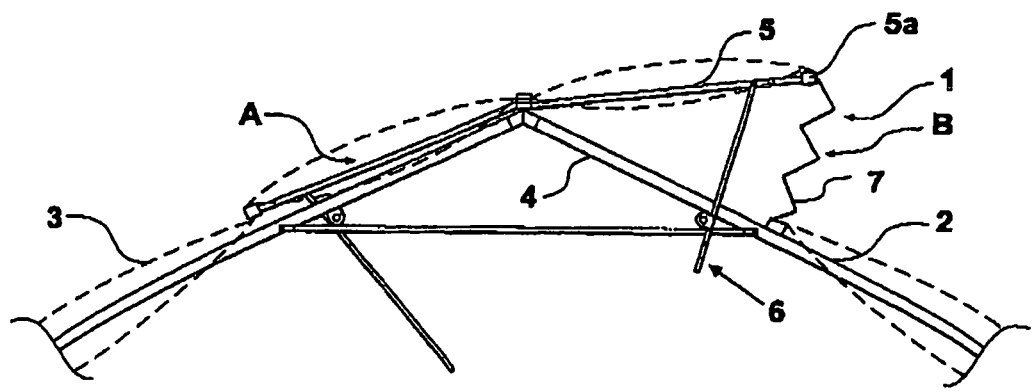

This application claims priority to New Zealand Application No. 523395 filed Dec. 24, 2002.

INTRODUCTION

The present invention relates to a ventilation system, and to a truss arrangement that may form part of the ventilation system. The system of the invention has particular, but not exclusive, application to greenhouses and animal shelters.

BACKGROUND

In many buildings with agricultural applications, such as greenhouses or animal shelters, it is desirable to provide ventilaton This allows plants and animals to obtain air and is an effective means of moderating the temperature, humidity and other environmental conditions of the interior of the building. However, the ventilation systems can allow pests such as birds, insects, moths and flies to enter the building. The pests may then destroy plants or infest animals housed in the building.

In the past, this problem has been addressed by using a venting system in the roof of the building that includes a hole or aperture in the roof, a flap that may cover the aperture and fabric extending between the aperture and the flap. The fabric allows air to flow into the building but excludes pests. However, this fabric often becomes dirty. This reduces the flow of air through the fabric and the fabric requires cleaning. To clean the fabric requires access to the upper surface of the roof of the building. Access to the fabric is difficult, and climbing on the roof of the building is undesirable, particularly when the building is constructed of material that is easily damaged, as is the case for a plastics or glass greenhouse.

The object of the present invention is to overcome the abovementioned difficulties, or at least provide the public with a useful alternative.

SUMMARY OF INVENTION

The first aspect of the invention provides a ventilation system for a building including:
  at least one vent comprising an aperture in the roof of the building; and
  at least one fabric member adapted to be attached to the roof inside the building, below the vent(s) and between the vent(s) and the interior of the building.

Preferably, the vent includes a flap selectively positionable to cover the aperture. More preferably, the flap is hingedly attached to the roof proximate a side of the aperture.

Preferably, the flap includes a rack and pinion device for selectively maintaining the flap in an open position.

Preferably, the fabric member further includes a support for shaping the fabric member.

Preferably, the support is U-shaped. Alternatively, the support is a concertina shape.

Preferably, the support is made of wire.

Preferably, the fabric is impervious to birds, moths, flies and insects.

The second aspect of the invention provides building including:
  at least one vent comprising an aperture in the roof of the building; and
  at least one fabric member attached to the roof inside the building, below the vent(s) and between the vent(s) and the interior of the building.

Preferably, the building has a pitched roof.

Preferably, the vent(s) are proximate the ridge of the pitched roof.

Preferably, the pitched roof includes a plurality of cross-section supports, each support including a tie beam, and the at least one fabric member is located below the tie beams. More preferably, each cross-sectional support further includes a second tie beam located below the fabric member(s) and a side post on either side of the ridge of the roof and the fabric members).

Preferably, one fabric member covers the at least one vent.

Preferably, the building is a greenhouse or animal shelter.

In a third aspect of the invention there is provided a prefabricated building member for a building having a pitched roof, including:
  two principal rafters, each rafter having a first end and a second end, the first ends of the rafters being joined at a angle;
  a first tie beam attached to the first and second rafters at a point intermediate the first and second ends of each rafter;
  a second tie beam attached to the first and second rafters at a point proximate the second end of each rafter;
  a first side post attached to the second tie beam and the first rafter at a point intermediate the second end of the rafter and the attachment of the first tie beam; and
  a second side post attached to the second tie beam and the second rafter at a point intermediate the second end of the rafter and the attachment of the first tie beam.

Preferably, the first and second side posts are attached to the second tie beam at an angle of approximately 90°.

According to a forth aspect of the invention there is provided a retaining rail for use the in ventilation system of the invention, comprising:
  a rail of selected length;
  at least one means for attaching the rail to at least one principal rafter of the roof of a building;
  means for attaching plastic forming part of the roof of the building to the rail; and means for attaching the fabric to the rail.

Preferably, the retaining rail further comprises means for attaching the support to the rail.

Preferably, comprising a means for attaching the rail to each rafter to which the rail is to be attached.

Preferably, the means for attaching the rail to the at least one rafter is a two-way bracket.

Preferably, the means for attaching the plastic forming part of the roof is a plurality of clips attached to the rail at selecting intervals along the length of the rail. Alternatively, the means for attaching the plastic forming part of the roof is a continuous clip of selected length extending along at least part of the length of the rail.

Preferably, the means for attaching the fabric to the rail is a plurality of clips attached to the rail at selecting intervals along the length of the rail. Alternatively, the means for attaching the fabric to the rail is a continuous clip of selected length extending along at least part of the length of the rail.

Preferably, the means for attaching the support to the rail is a rod extending from the rail such that in use, the rod is received in a recess or bore in the end of the support member.

BRIEF DESCRIPTION OF THE INVENTION

Figure 2:
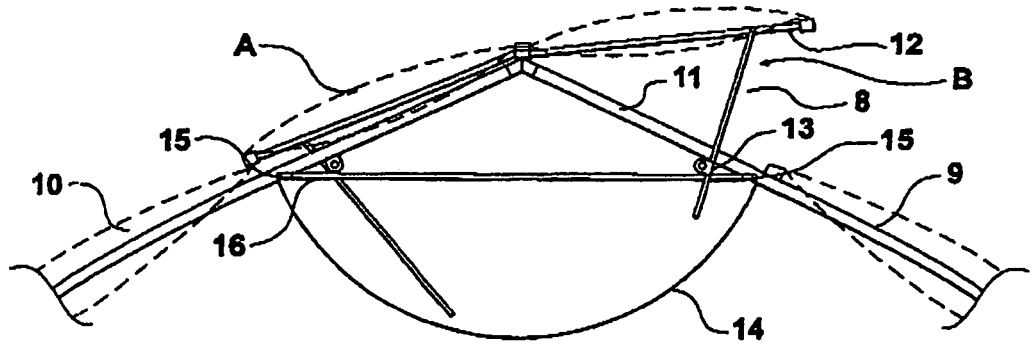
Figure 3:
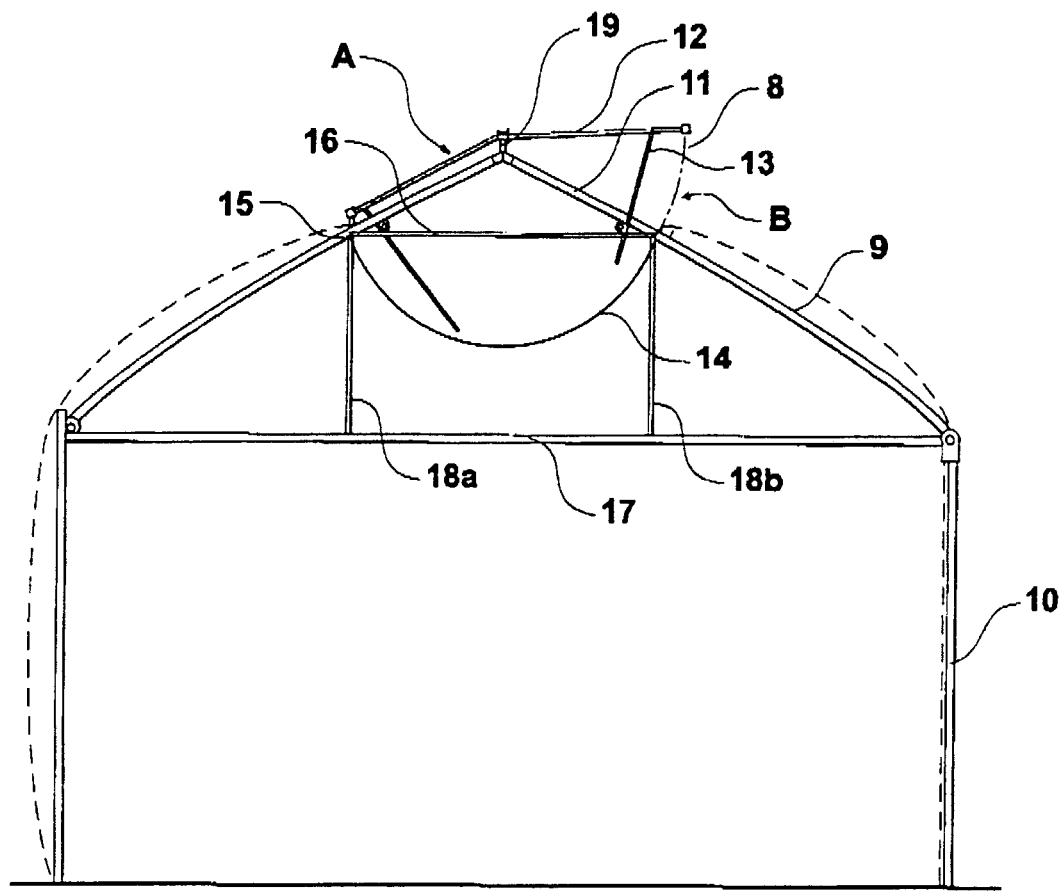
Figure 4:
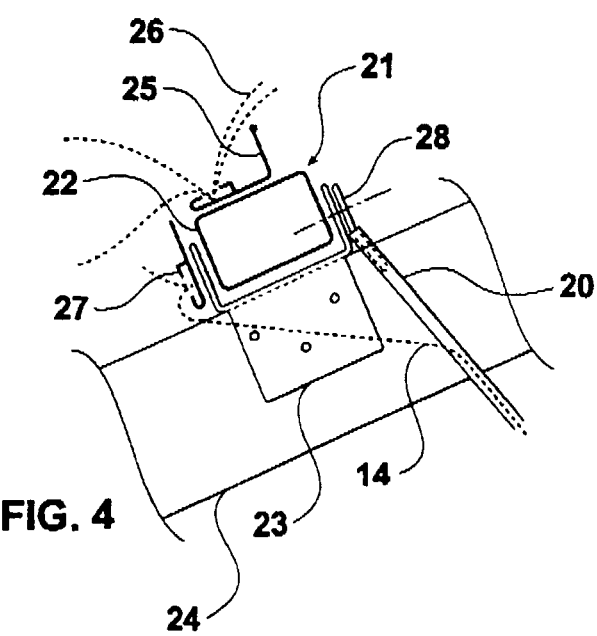

A preferred embodiment of the invention will now be described, by way of example only with reference to:

FIG. 1, which is a cross-sectional view of the roof of a building including a ventilation system of the prior art;

FIG. 2, which is a cross-sectional view of part of the roof of a building including a ventilation system and a truss of the invention;

FIG. 3, which is a cross-sectional view of a building including a ventilation system and an alternative truss of the invention;

FIG. 4, which is a cross-section view of a retaining rail according to the invention.

DETAILED DESCRIPTION

Referring firstly to FIG. 1, a ventilation system of the prior art comprises at least one vent (1) provided in the roof (2) of a building (3). The vent (1) comprises an opening or aperture (4) in the roof (2), and a flap (5) which in a closed position (A) covers the opening (4). In one arrangement, one end of the flap (5) is hingedly attached to the roof (2) adjacent one side of the opening (4), so that the flap (5) may be moved from the closed position (A) to an open position (B) by some suitable means (6). The means may be automated or manual and is illustrated in FIG. 1 as a rack and pinion.

Extending between the non-attached end (5a) of the flap (5) and the roof (2) is a mesh-type fabric (7). In the open position (B), the fabric (7) allows air to flow into the interior of the building (2), but because the fabric (7) is of a mesh-type, insects, birds and other pests are excluded.

In the arrangement shown in FIG. 1, the fabric (7) is in the form of a concertina. This increases the surface area of the fabric, allowing greater air flow.

When the flap (5) is in the closed position (A), the fabric (7) is folded and sits inside or adjacent the opening or aperture (4), allowing the flap (5) to sit closely against the roof (2).

One problem already discussed is the cleaning of the fabric (7). To do this effectively, the flap (5) must be in the open position (A). Cleaning requires a person to access the upper surface of the roof (2), which of course may be dangerous. This is particularly the case if the roof (2) is formed of glass or plastic, as is the case with greenhouses.

The ventilation system of the present invention provides a different arrangement. As illustrated in FIG. 2, the ventilation system of the present invention comprises at least one vent (8) in the roof (9) of a building (10). The vent (8) comprises an opening or aperture (11) in the roof (9) and a flap (12) which in a closed position (A) covers the opening (11). Preferably, the flap (12) in hingedly attached to the roof (9) adjacent one side of the opening (11), so that the flap (12) may be moved from the closed position (A) to an open position (B). This is achieved by some suitable means, which may be automated or manual. For example, and as shown in FIG. 2, this may be by way of a rack and pinion (13).

Mesh-type fabric (14) is provided, which allows air to flow into the building (10) but which also excludes pets such as birds and insects.

In the preferred form of the invention shown in FIG. 2, the fabric (14) is located inside the building (10). The fabric (14) extends across the apex of the roof (9) and is fixed at points (15) which are lower down the roof (9) than the opening(s) (11). This ensures that the fabric (14) is located between the opening(s) (11) and the interior of the building (10).

It will be appreciated that the roof of a building such as a greenhouse may be supported by a truss arrangement. As shown in FIG. 2, the truss arrangement may include a tie beam (16). In one form of the invention, the tie beam (16) is located above the fabric (14). The tie beam (16) provides strength to the roof (9) and allows the fabric (14) to be installed in lengths under the vent(s) (8).

An alternative arrangement is shown in FIG. 3. As well as the tie beam (16), the truss arrangement includes a second tie beam (17) preferably located below the fabric (14), and side beams (18a,18b). The side beams (18a,18b) strengthen the truss arrangement and provide load support. Load support may be required for example in a greenhouse, where crops, including root mass, are to be held clear of the ground or floor. This is desirable in some situations, and is achieved using platforms suspended from the truss arrangements.

The flap (12) may be attached to the roof (9) via one or more spacers (19). This increases the pitch of the flap (12) when in a closed position (A). This is particularly important when the flap (12) is made of plastics material. In wet weather, water can pool on the flap (12). If a sufficient amount of water collects on the flap (12), the plastics material may give way and the water will be dumped into the building (10). If the pitch of the flap (12) is increased, water can more easily run off and is less likely to pool on the flap.

In the arrangements shown in FIGS. 2 and 3, the fabric (14) is substantially U-shaped. This shape is primarily due to the way the fabric (14) has been suspended from the truss. The fabric (14) can also be shaped by a support (20) as shown in FIG. 4. The support (20) may be a wire or other semi-rigid material that can be shaped. The fabric (14) is shaped to increase the surface area thus allowing a greater volume of air to enter the building (10). Alternative shapes, such as a concertinaed shape, also form part of the invention.

Referring now to FIG. 4, the present invention also provides a retaining rail (21) adapted for use in buildings comprising the ventilation system according to the present invention and plastics film forming part of the roof (9). The retaining rail (21) includes rail (22) attached to a two-way bracket (23). The two-way bracket may then be attached to a rafter (24) of the building (10). The retaining rail (21) also comprises means (25) for retaining plastics film (26) forming part of the roof (9) of the building (10); means (27) for attaching the fabric (14) to the retaining rail (21); and means (28) for attaching the support (20) to the retaining rail (21).

The fabric (14) may be any suitable material, such as wire or plastics mesh. Positioning the fabric (14) underneath the roof (9) of the building (10) allows easier access to the fabric (14) than if the fabric (14) were between the flap (12) and the roof (9). This makes cleaning, servicing or changing the fabric (14) much easier.

One or more fabric members (14) may cover the at least one vent (8). FIG. 1 illustrates a single fabric member (14) covering more than one vent (8). However, the exact number of fabric members (14) is not limited to that illustrated. Each vent (8) may be covered by a single fabric member (14), or a single fabric member (14) may cover more than one vent (8).

In use, the vent (8) is opened by moving the flap (12) from a closed position (A) into an open position (B). The means (13) for selectively maintaining the vent (8) in an open position may be manually operated or automated. Once in an open position (B), the fabric (14) excludes birds, flies, moths and insects from the building (10). The vent (8) can be closed by means (13). The fabric (14) may be cleaned, serviced or replaced from inside the building (10).

Where in this description, reference has been made to integers or components having known equivalents, those equivalents are herein incorporated as if individually set forth.

It will be appreciated by one skilled in the art that variations and modifications can be made to this invention without departing from the scope of the invention as defined in the claims.

The invention claimed is:

1. A ventilation system for a building including:
   at least one vent wherein each vent comprises an aperture in the roof of the building, a flap movable from a closed position in which said corresponding aperture is covered to an open position in which said corresponding aperture is uncovered, and a rack and pinion device selectively maintaining said flap in said open or said closed position; and
   at least one insect net comprising a fabric member impervious to birds, moths, flies and very small insects, and at least one curved support which shapes said fabric member into a curved shape, wherein each said fabric member and each said curved support are sealed to said roof inside said building below said vents and said rack and pinion device and between said vents and said rack and pinion device and the interior of said building.

2. The ventilation system according to claim 1, wherein the flap is hingedly attached to the roof proximate a side of the corresponding aperture.

3. A building including:
   at least one vent each vent comprising an aperture in the roof of the building, a flap movable from a closed position in which said corresponding aperture is covered to an open position in which said corresponding aperture is uncovered, and a rack and pinion device selectively maintaining said flap in said open or said closed position; and
   at least one insect net comprising a fabric member impervious to birds, moths, flies and very small insects, and at least one curved support which shapes said fabric member into a curved shape, each said fabric member and each said curved support sealed to the roof inside the building below the vents and the rack and pinion device and between the vents and said rack and pinion device and the interior of the building.

4. The building according to claim 3 having a pitched roof.

5. The building according to claim 4, wherein the vent(s) are proximate the ridge of the pitched roof.

6. The building according to claim 5, wherein the pitched roof includes a plurality of cross-section supports, each support including a tie beam, and the at least one fabric member is located below the tie beam.

7. The building according to claim 6 wherein each cross-sectional support further includes a second tie beam located below the fabric member(s) and a side post on either side of the ridge of the roof and the fabric member(s).

8. The building according to claim 3, wherein one fabric member covers the at least one vent.

* * * * *